(12) United States Patent
Riendeau et al.

(10) Patent No.: US 11,171,402 B2
(45) Date of Patent: Nov. 9, 2021

(54) WIRELESS TELECOMMUNICATION SYSTEM FOR AN EQUIPMENT IN AN UNDERGROUND STRUCTURE

(71) Applicant: HYDRO-QUÉBEC, Quebec (CA)

(72) Inventors: Sylvain Riendeau, Varennes (CA); Pierre Gingras, Saint-Bruno-de-Montarville (CA); François Bélanger, Saint-Basile-Le-Grand (CA)

(73) Assignee: HYDRO-QUÉBEC, Quebec (CA)

( * ) Notice: Subject to any disclaimer, the term of this patent is extended or adjusted under 35 U.S.C. 154(b) by 280 days.

(21) Appl. No.: 16/230,243

(22) Filed: Dec. 21, 2018

(65) Prior Publication Data
US 2020/0203796 A1 Jun. 25, 2020

(51) Int. Cl.
*H01Q 1/04* (2006.01)
*H01Q 1/42* (2006.01)
(Continued)

(52) U.S. Cl.
CPC ............. *H01Q 1/04* (2013.01); *H01Q 1/1221* (2013.01); *H01Q 1/42* (2013.01); *H04W 88/085* (2013.01); *H04B 7/0413* (2013.01); *H04B 7/10* (2013.01)

(58) Field of Classification Search
CPC .......... H01Q 1/04; H01Q 1/42; H01Q 1/1221; H01Q 15/08; H01Q 1/246; H01Q 21/28; H04W 88/085; H04B 7/10; H04B 7/0413; G01D 4/008; G01D 4/004; G01D 4/002; G01D 4/006; G01F 15/063; G01F 15/061; G06Q 50/06; Y04S 20/30
See application file for complete search history.

(56) References Cited

U.S. PATENT DOCUMENTS

| 4,687,445 A | 8/1987 | Williams |
| 5,298,894 A * | 3/1994 | Cerny .................... G08C 17/02 340/870.02 |

(Continued)

FOREIGN PATENT DOCUMENTS

| CN | 102561399 | 8/2015 |
| EP | 1867791 | 3/2009 |

(Continued)

OTHER PUBLICATIONS

Bonneau, "Un pas de plus vers le réseau intelligent", HydroPresse, May 2018, pp. 22-23.

*Primary Examiner* — Andrea Lindgren Baltzell
*Assistant Examiner* — Bamidele A Jegede
(74) *Attorney, Agent, or Firm* — Muirhead and Saturnelli, LLC (57) ABSTRACT

A wireless telecommunication system for an equipment in an underground structure is disclosed. The system comprises a metal cover fitting in an opening of the underground structure while being supported by a shoulder. A porthole is formed in the cover. The porthole has a lens in plastic material letting radio waves pass. A cradle hangs across the opening. An antenna arrangement is mounted on the cradle and extends near and in alignment with the lens. A radio transceiver connects to the antenna arrangement and to the equipment in the underground structure to establish a wireless telecommunication with the equipment via the antenna arrangement and the lens.

20 Claims, 10 Drawing Sheets

(51) Int. Cl.
*H04W 88/08* (2009.01)
*H01Q 1/12* (2006.01)
*H04B 7/10* (2017.01)
*H04B 7/0413* (2017.01)

(56) References Cited

U.S. PATENT DOCUMENTS

| | | | | |
|---|---|---|---|---|
| 5,583,492 A | * | 12/1996 | Nakanishi | G08C 17/02 340/870.02 |
| 5,825,303 A | * | 10/1998 | Bloss, Jr. | H01Q 1/2233 340/870.02 |
| 5,877,703 A | * | 3/1999 | Bloss, Jr. | G01D 4/004 340/870.02 |
| 6,072,405 A | | 6/2000 | Sears | |
| 6,078,283 A | * | 6/2000 | Bednar | G01V 1/201 342/357.57 |
| 6,177,883 B1 | * | 1/2001 | Jennetti | G08C 17/02 340/870.02 |
| 6,218,995 B1 | * | 4/2001 | Higgins | H01Q 1/42 343/719 |
| 6,272,346 B1 | | 8/2001 | Fujinami | |
| 6,378,817 B1 | * | 4/2002 | Bublitz | H01Q 1/2233 248/200 |
| 6,414,605 B1 | * | 7/2002 | Walden | G01D 4/008 340/870.02 |
| 6,954,144 B1 | * | 10/2005 | Kiser | G01D 4/002 340/539.26 |
| 7,002,481 B1 | | 2/2006 | Crane et al. | |
| 7,342,504 B2 | | 3/2008 | Crane et al. | |
| 7,626,508 B2 | | 12/2009 | Kosuge et al. | |
| 7,768,413 B2 | | 8/2010 | Kosuge et al. | |
| 7,943,868 B2 | | 5/2011 | Anders et al. | |
| 8,011,628 B1 | * | 9/2011 | Suddeth | H01Q 1/12 248/225.11 |
| 8,135,352 B2 | | 3/2012 | Langsweirdt et al. | |
| 8,434,717 B2 | * | 5/2013 | Meyer | B64C 1/36 244/121 |
| 9,961,418 B2 | * | 5/2018 | Rodriguez, Jr. | G05B 15/02 |
| 2002/0089428 A1 | * | 7/2002 | Walden | G01D 4/008 340/870.02 |
| 2003/0178425 A1 | * | 9/2003 | McKinnon | H02G 3/14 220/254.3 |
| 2004/0056807 A1 | * | 3/2004 | Winter | G01D 5/2515 343/700 MS |
| 2004/0150575 A1 | * | 8/2004 | Lizalek | H01Q 13/10 343/767 |
| 2004/0196159 A1 | * | 10/2004 | Brennan | G08C 17/02 340/870.02 |
| 2005/0285807 A1 | * | 12/2005 | Zehngut | H01Q 1/2233 343/719 |
| 2006/0021447 A1 | * | 2/2006 | Hecht | E02D 13/06 73/803 |
| 2006/0218104 A1 | * | 9/2006 | Johnson | G01D 4/004 705/412 |
| 2006/0226325 A1 | * | 10/2006 | Cook | G01F 15/18 248/316.8 |
| 2006/0227006 A1 | * | 10/2006 | Gould | G01D 4/006 340/870.02 |
| 2007/0018849 A1 | * | 1/2007 | Salser, Jr. | G01D 4/002 340/870.02 |
| 2007/0026796 A1 | | 2/2007 | Mizushina et al. | |
| 2007/0270012 A1 | * | 11/2007 | Showcatally | G01D 4/002 439/277 |
| 2008/0074283 A1 | * | 3/2008 | Verkleeren | H01Q 1/2233 340/870.02 |
| 2010/0026515 A1 | * | 2/2010 | Lazar | G01F 15/063 340/870.02 |
| 2011/0006182 A1 | * | 1/2011 | Hockema | H01Q 1/00 248/224.8 |
| 2011/0062298 A1 | * | 3/2011 | Bartram | G01F 15/18 248/222.14 |
| 2011/0063124 A1 | * | 3/2011 | Bartram | G01F 15/18 340/870.02 |
| 2016/0093947 A1 | * | 3/2016 | Kenig | H01Q 21/24 343/878 |
| 2016/0094897 A1 | * | 3/2016 | Kenig | H04Q 9/00 340/870.02 |
| 2017/0155191 A1 | | 6/2017 | Kim et al. | |
| 2018/0054661 A1 | * | 2/2018 | Howard | H05K 5/0239 |
| 2018/0358682 A1 | * | 12/2018 | Cousin | H01Q 5/30 |
| 2019/0226874 A1 | * | 7/2019 | Slater | H04Q 9/00 |

FOREIGN PATENT DOCUMENTS

| | | | |
|---|---|---|---|
| GB | 2326002 | 12/1998 | |
| JP | H 1166484 | 3/1999 | |
| KR | 101394071 | 5/2014 | |
| KR | 101394071 B1 * | 5/2014 | H01Q 1/04 |
| WO | WO 2016198491 | 12/2016 | |
| WO | WO 2017136149 | 8/2017 | |

* cited by examiner

WIRELESS TELECOMMUNICATION SYSTEM FOR AN EQUIPMENT IN AN UNDERGROUND STRUCTURE

FIELD OF THE INVENTION

The invention relates to a wireless telecommunication system for an equipment in an underground structure and a method for providing a wireless link to an equipment in an underground structure.

CONTEXT

Communication systems for underground structures already exist. Some systems are intended in particular to generate an alarm in case the cover of the structure is removed, especially to prevent theft of the cover or an unauthorized access in the structure. Some systems are intended to communicate with the equipment in the underground structure.

U.S. Pat. No. 7,002,481 (Crane et al.), U.S. Pat. No. 7,342,504 (Crane et al.), U.S. Pat. No. 7,626,508 (Kosuge et al.) and U.S. Pat. No. 7,768,413 (Kosuge et al.), WO application 2016198491 (Schlosser), US application 20070026796 (Mizushina et al.), U.S. Pat. No. 5,583,492 (Nakanishi et al.), U.S. Pat. No. 9,961,418 (Rodriguez, Jr. et al.), and WO application 2017136149 (Rodriguez, Jr. et al.) provide examples of systems proposed in the art.

The systems proposed in the art all exhibit various drawbacks. For example, some systems use covers wholly made of plastic material that are lighter than the covers made of cast-iron commonly used for the existing underground structures. To prevent them from moving due to vibrations caused by the passing of vehicles or their manipulation by the public, the covers in plastic material require additional mechanisms to secure them to the underground structures. The durability of the covers wholly made of plastic material is less than their metal equivalent.

Other systems incorporate or attach an antenna, a portion of antenna or a communication device to an altered metal cover. The alteration of the cover is likely to create weakness problems and to have impacts on its certification. Metal covers are heavy and the presence of a cable attached to the cover makes its handling more difficult. The exposed cable is subjected to breakings that will be visible only when the cover will be removed. The weight of the assembly makes it difficult to perform maintenance of the elements forming the telecommunication system.

Some systems propose an antenna located under a cover provided with an opening filled by a plastic element that may comprise a repeater antenna integrated to the plastic element. These systems are generally limited to a particular frequency band. Cellular networks use many frequency bands ranging from 600 MHz to over 3 GHz. The mounting methods of the systems unattached to the covers are sensitive to the horizontal and vertical positioning of the covers with respect to the antennas, to an accumulation of debris or a presence of water between the covers and the antennas located under them.

SUMMARY

According to an embodiment of the invention, there is provided a wireless telecommunication system for an equipment in an underground structure having an upper frame defining an opening with a shoulder for supporting a cover, the system comprising:

a metal cover having a shape fitting in the opening so that the cover is supportable in position in the opening by the shoulder;

at least one porthole formed in the cover, the porthole having a lens in plastic material letting radio waves pass;

a cradle having a beam and brackets projecting at opposite ends of the beam, the brackets defining bearing surfaces against the shoulder in order to hang the beam across the opening when the cradle is in position in the opening, the beam having a support section extending lower than the bearing surfaces;

at least one antenna arrangement mounted on the support section of the beam and extending near and in alignment with the lens when the cradle and the cover are in position in the opening; and a radio transceiver connecting to the antenna arrangement and to the equipment in the underground structure to establish a wireless telecommunication with the equipment via the antenna arrangement and the lens.

According to another embodiment, there is proposed a method for providing a wireless link to an equipment in an underground structure having an upper frame defining an opening with a shoulder for supporting a cover, the method comprising the steps of:

positioning a cradle in the opening, the cradle having a beam and brackets projecting at opposite ends of the beam, the brackets defining bearing surfaces against the shoulder in order to hang the beam across the opening, the beam having a support section extending lower than the bearing surfaces, at least one antenna arrangement being mounted on the support section of the beam;

connecting a radio transceiver to the antenna arrangement and to the equipment in the underground structure;

positioning a metal cover having a shape fitting in the opening so that the cover is supported in the opening by the shoulder, at least one porthole being formed in the cover, the porthole having a lens in plastic material letting radio waves pass, the antenna arrangement extending near and in alignment with the lens when the cradle and the cover are in position in the opening; and establishing a wireless telecommunication by the radio transceiver with the equipment via the antenna arrangement and the lens.

BRIEF DESCRIPTION OF THE DRAWINGS

A detailed description of preferred embodiments will be given herein below with reference to the following drawings.

DETAILED DESCRIPTION OF THE PREFERRED EMBODIMENTS

Figure 1A:
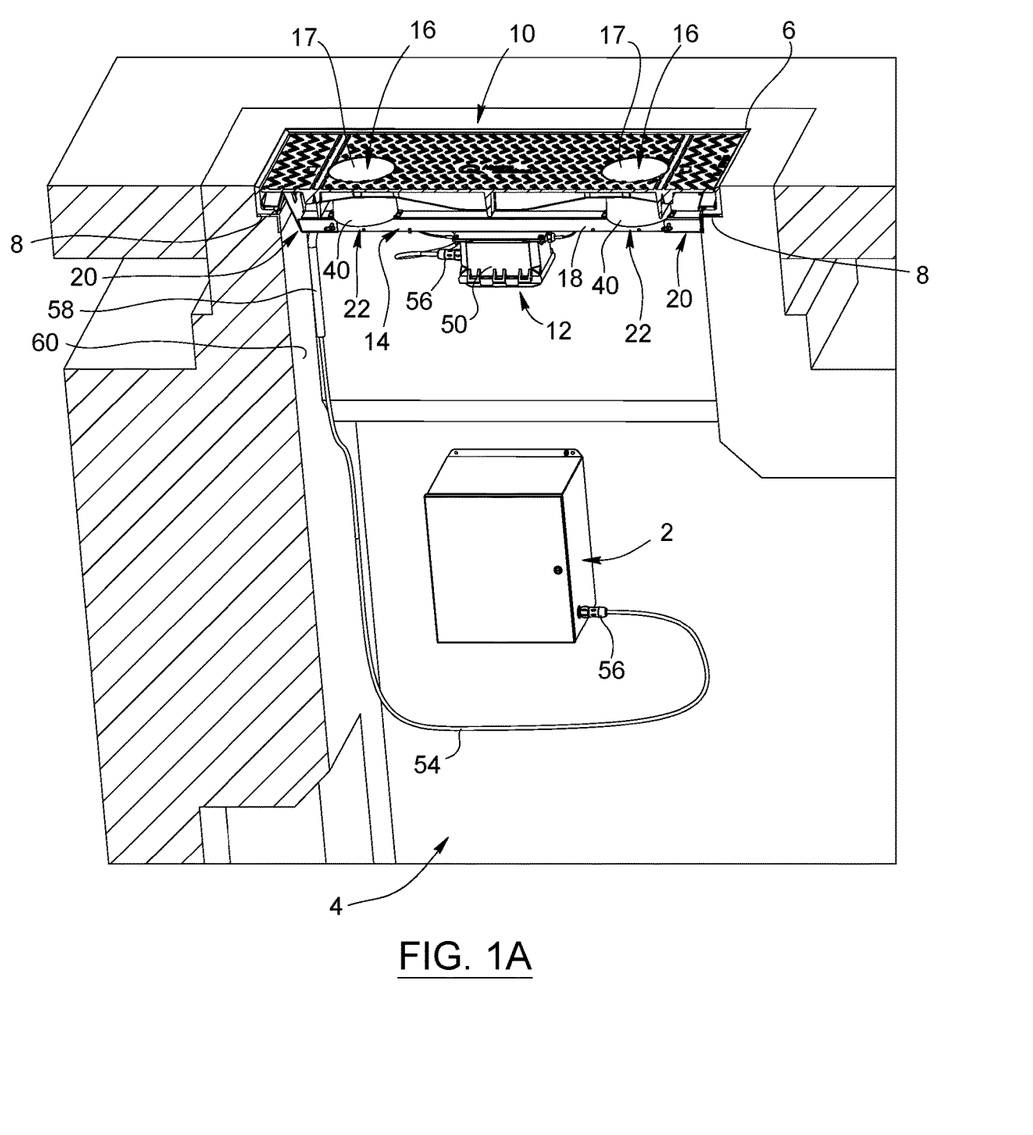
FIG. 1A is a cross-sectional isometric view of a wireless telecommunication system for an equipment in an underground structure according to the invention, with a rectangular cover.

Referring to FIG. 1A, a wireless telecommunication system for an equipment 2 in an underground structure 4 according to the invention is illustrated. The underground structure 4 has an upper frame 6 defining an opening whose ledge forms a shoulder 8 for supporting a cover. The frame 6 may be formed by the underground structure 4 or be a separate element. The shoulder 8 may be discontinuous, as long as it provides adequate support for one or several covers.

The system according to the invention comprises a metal cover 10 having a shape fitting in the opening so that the cover 10 is supported in position in the opening by the shoulder 8. In the case of FIG. 1A, the system according to the invention is adapted for an underground structure 4 having a rectangular opening, the shape of the cover 10 being also rectangular. Several covers may be disposed side by side depending on the size of the opening, with at least one of the covers in conformity with the system according to the invention.

According to an embodiment, two portholes 16 are formed in the cover 10. Each porthole 16 has a lens 17 in plastic material letting radio waves pass.

The system according to the invention also comprises a cradle 14 having a structure adapted to rest on the shoulder 8 of the underground structure 4 under the cover 10 but without being attached to the cover 10. The cradle 14 has a beam 18 and brackets 20 projecting at opposite ends of the beam 18. The brackets 20 provide bearing surfaces against the shoulder 8 in order to hang the beam 18 across the opening when the cradle 14 is in position in the opening. The beam 18 has a support section extending lower than the bearing surfaces of the brackets 20. In the illustrated embodiment, the whole beam 18 may be used as support section due to its straight profile and the shape of the supports 20 that project upwardly and provide higher bearing surfaces. The support section of the beam 18 could be a central section if, for example, the beam 18 has a shape that raises or lowers with respect to a general plane (e.g. horizontal) of the cover 10, or if the supports 20 are integrated to the beam 18 or have different configurations.

According to an embodiment, two antenna arrangements 22 are mounted on the support section of the beam 18 and are positioned to extend near and in alignment with the lenses 17 of the portholes 16 when the cradle 14 and the cover 10 are in position in the opening.

The system according to the invention further comprises a radio transceiver 12 connecting to each antenna arrangement 22 and to the equipment 2 in the underground structure 4 to establish a wireless telecommunication with the equipment 2 via the antenna arrangements 22 and the lenses 17 of the portholes 16.

In the illustrated embodiments of the invention, the system comprises two portholes 16 spaced from each other in the cover 10, and two antenna arrangements 22 positioned under the respective portholes 16. Such a system in particular allows the antenna arrangements 22 to have respective antennas oriented in order to exhibit complementary polarizations for a better MIMO ("Multiple-Input Multiple-Output") effect. However, the system may comprise a single set of porthole 16 and antenna arrangement 22, located for example in a central vertical axis of the system. The system may also comprise more than two sets of porthole 16 and antenna arrangement 22 if desired, depending on the needs of the landscape in the neighbourhood of the underground structure 4 and the technology or technologies used to establish the telecommunication links with the equipment 2 in the underground structure 4.

Figure 1B:
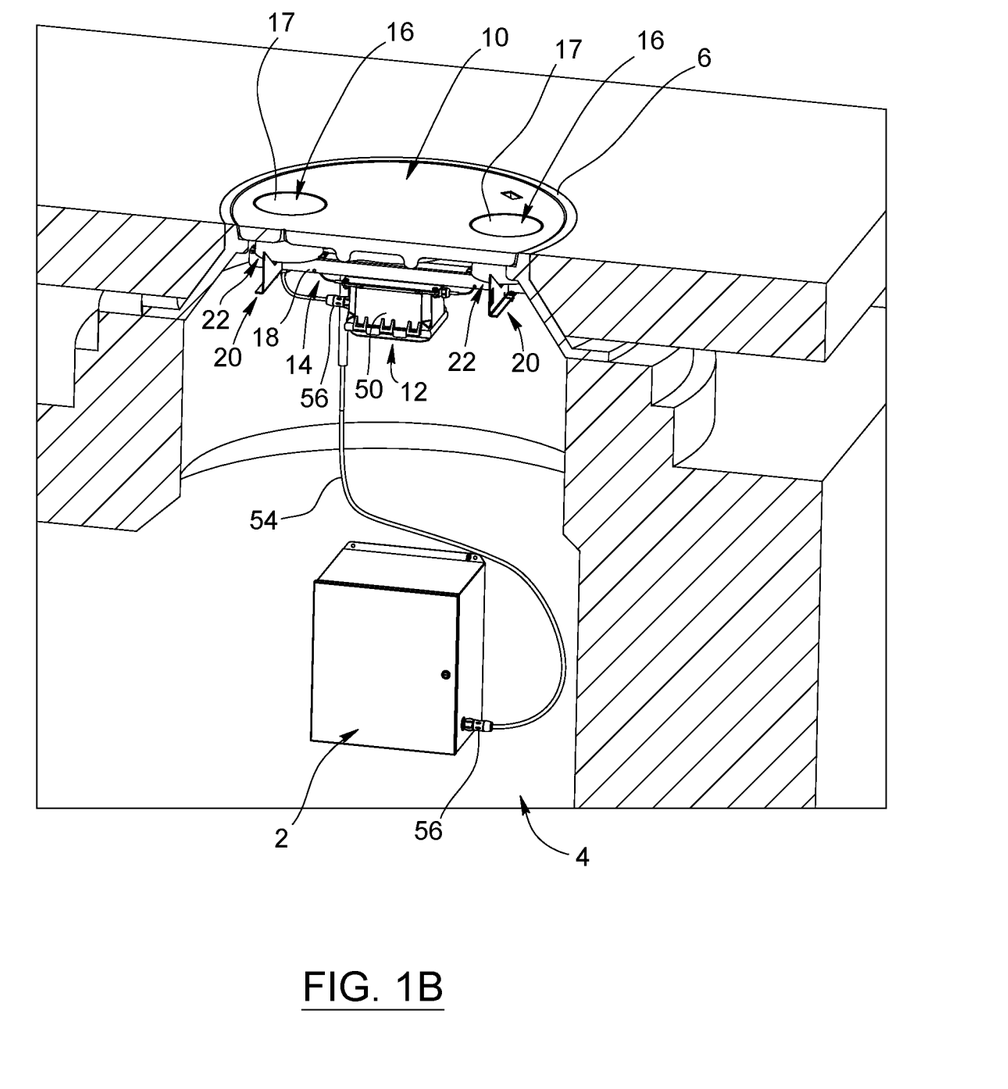
FIG. 1B is a cross-sectional isometric view of a wireless telecommunication system according to the invention, with a round cover.

Referring to FIG. 1B, the system according to the invention may be adapted for an underground structure 4 having a round opening, the shape of the cover 10 being then also round. The structure of the cradle 14 and its arrangement of reinforcement ribs 76, 77, 79 (as shown in FIG. 2B) on the lower surface of the cover 10 are adapted to the configuration of the round opening as described hereinafter.

Figure 2A:
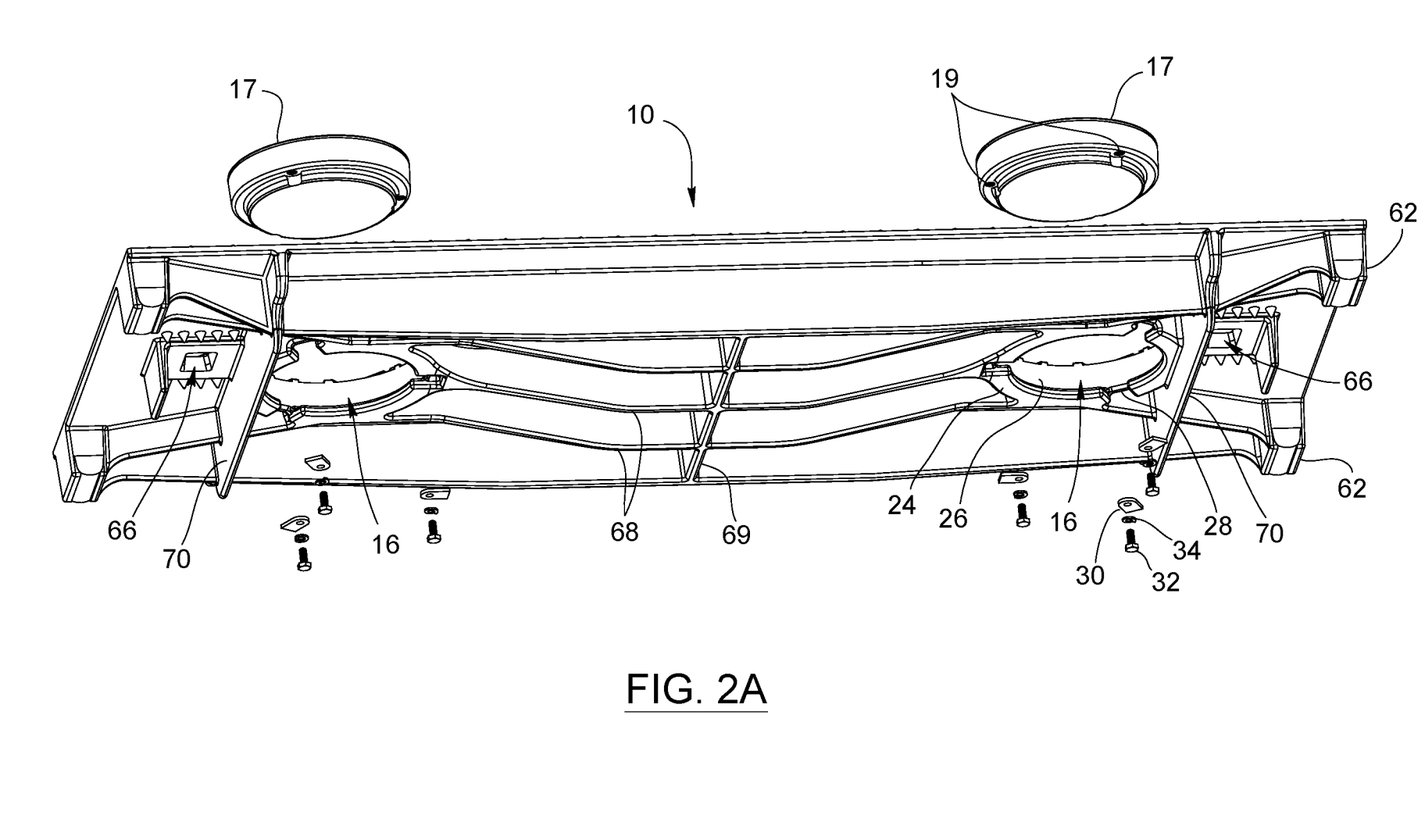
FIG. 2A is an exploded isometric view showing a rectangular cover assembly according to the invention.
Figure 2B:
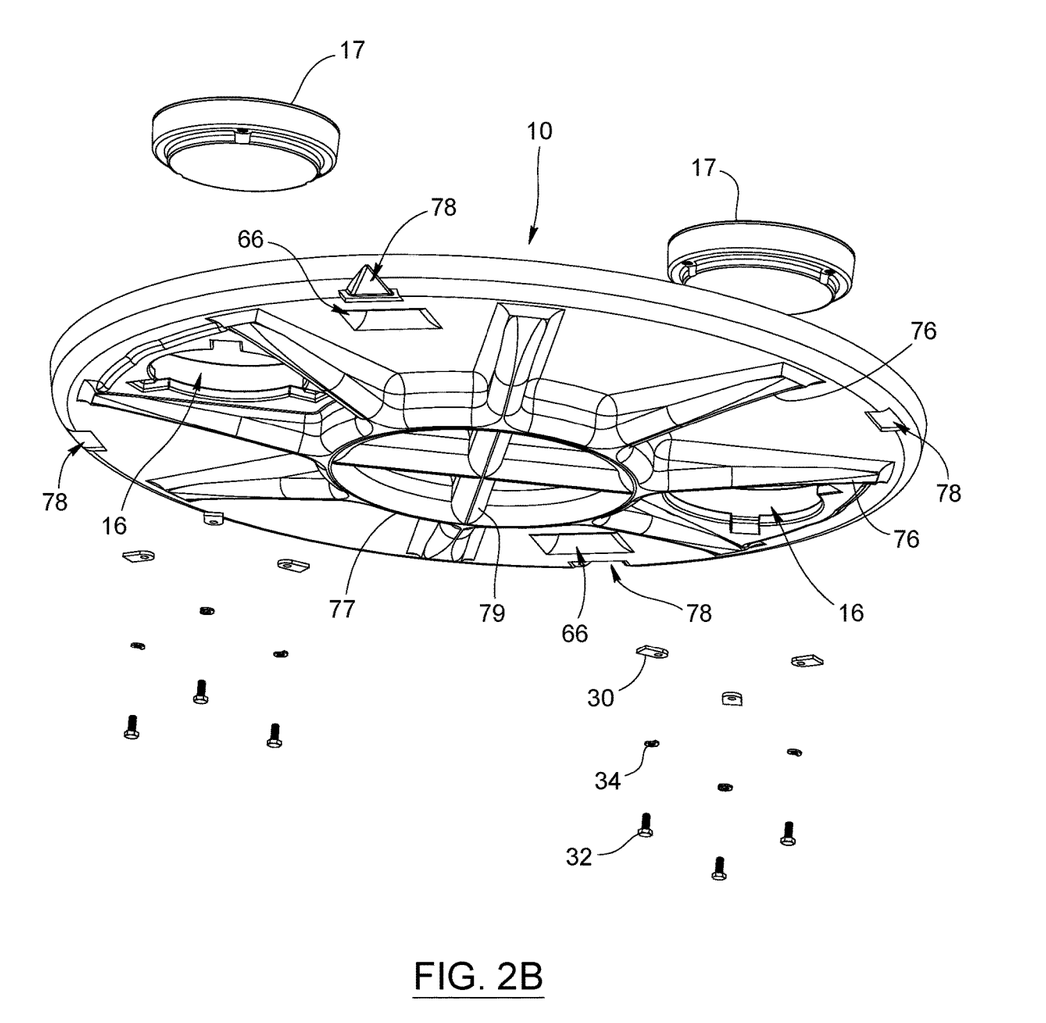
FIG. 2B is an exploded isometric view showing a round cover assembly according to the invention.

Referring to FIG. 2A, the metal cover 10 is preferably in cast-iron, so that it is heavy to deter undesirable manipulations and minimize the vibrations during passage of vehicles. A typical but not limitative dimension of a rectangular cover 10 according to the invention is 477 mm of width by 1184 mm of length. The total weight of the cover 10 with porthole(s) 16 and lens(es) 17 may advantageously be similar to that of the existing metal covers in use. The upper face or surface of the cover 10 may comprise a non-skid pattern (as shown in FIG. 1A), identification or decorative marks similar to the covers in use. The upper surface of the lenses 17 is preferably flat. The lenses 17 and the cover 10 may have upper surfaces extending in a same plane. The upper surface of the lenses 17 may extend slightly back from the plane of the upper surface of the cover 10 if desired.

The cover 10 and the portholes 16 are preferably molded in a single piece. According to an embodiment, each porthole 16 has a cylindrical shape and has a lower peripheral shoulder 24 and its inner wall 26 has a slightly conical shape e.g. at an angle of 3 degrees with respect to the vertical, like the peripheral surface of the lenses 17 for a simple and effective nesting and holding. The peripheral shoulder 24 has three notches 28 used as bearing points for mounting tabs 30 of the lens 17. The number of notches 28 may be e.g. two or more than three if desired. The cover 10 is thus made up of only robust and reliable passive elements. No electronic element, antenna or cable is connected to the cover 10. The lenses 17 may be secured to the cover 10 by bolts 32 and the tabs 30 that press under the portholes 16 of the cover 10 so that the lenses 17 cannot be removed from outside when the cover 10 is in position in the access opening of the underground structure 4.

According to an embodiment, the lenses 17, as well as the portholes 16, preferably have a round shape, although another shape as a square shape may be suitable. The lenses 17 are installed from above the cover 10 and inserted in the round openings of the portholes 16 to then rest against the bottom rim of the lower peripheral shoulder 24 of the portholes 16 that forms a resting surface for the lenses 17. The preferably round profile of the lenses 17 matches that of the portholes 16. The dimensions of the lenses 17 are adjusted to allow an installation in the portholes 16 without requiring a machining of the cover 10. The mechanical strength of the assembly of the lenses 17 and the portholes 16, from outside towards the inside of the underground structure 4, depends on the dimensions of the shoulder 24 and of the wall 26 of the portholes 16, of the surface of the shoulder 24 of the portholes 16 in contact with the lenses 17 and of the thickness of the lenses 17. The properties of the metal material (e.g. cast-iron), a manufacturing process by casting and an absence of machining of the cover 10 advantageously allow ensuring the mechanical strength of the cover 10 and of the portholes 16. Preferably, the plastic material of the lenses 17 is a composite material called G10. The mechanical properties of this material that may form the core of the lenses 17 advantageously allow ensuring the mechanical strength of the lenses 17. The core of the lenses 17 may be machined or molded. A primer-sealer may be applied on all the faces of the lenses 17 to ensure waterproofing. The upper face or surface of the lenses 17 exposed to the outside of the underground structure 4 may have a wear-resistant non-skid finish, preferably a mixture of epoxy and of silica.

The cover 10 has a lower surface preferably comprising an arrangement of longitudinal reinforcement ribs 68 and transverse reinforcement ribs 69, 70. The ribs 70 extend crosswise on opposite sides of the cover 10 and form runners for the cover 10 on the upper frame 6 of the underground structure 4 when the cover 10 is transversely slid, as described hereinafter.

The lowermost frequency $f_{cm}$ in fundamental mode $TE_{11}$ that may pass in the lower round opening of the lens 17 of radius r is calculated as follows:

$$f_{cm} = \frac{1.841}{2\pi r\sqrt{\varepsilon\mu}} = \frac{978249079}{2\pi r\sqrt{\varepsilon_r\mu_r}}.$$

The relative permeability $\mu_r$ is 1 in the case of air or in presence of the lenses 17 made of non-magnetic material in the portholes 16. For a given frequency, the use of a material for the lenses 17 having a dielectric constant $\varepsilon_r$ (relative permittivity) greater than air $\varepsilon_0 = \varepsilon_r = 1$ allows advantageously reducing the radius r of the lenses 17 and thus of the portholes 16. The dielectric constant of the G10 composite material that may be used for the lenses 17 is 4.7, which allows reducing the radius of the openings by 2.16 times with respect to empty holes.

According to an embodiment, the lenses 17 have three mounting points 19. Two mounting points may be suitable, and more than three may be provided if desired. Each mounting point 19 may consist of a blind hole bored in the recessed lower rim of the lenses 17, beyond a preferably convex lower surface of the lenses 17 for reasons explained hereinafter. Each mounting hole may be threaded or provided with a threaded or unthreaded insert as illustrated. The lenses 17 are secured to the portholes 16 by means of tabs 30 preferably made of metal and of bolts 32 bolted in the lenses 17 or inserts for each mounting point. The tabs 30 press in the notches 28 of the portholes 16 and prevent rotation movements of the lenses 17 and their removal from the cover 10 towards the outside of the underground structure 4. Preferably, once assembled, the heads of the bolts 32 do not protrude under the lower surface of the portholes 16. The bolts 32, tabs 30, O-rings 34 and inserts (not shown) are preferably in stainless steel. The way of securing the lenses 17 in compression in the portholes 16 facilitates the manufacturing of the cover 10 (e.g. by casting) and minimizes finishing operations (e.g. boring and threading). The absence of mounting points in the cover 10 (e.g. threads and holes for bolts) facilitates the replacement of the lenses 17 since the assembly is not prone to corrosion problems. The lenses 17 are easily removable and may be advantageously replaced on site. The assembly configuration of the cover 10 facilitates the reusing, refurbishing and recycling of its components.

Figure 3A:
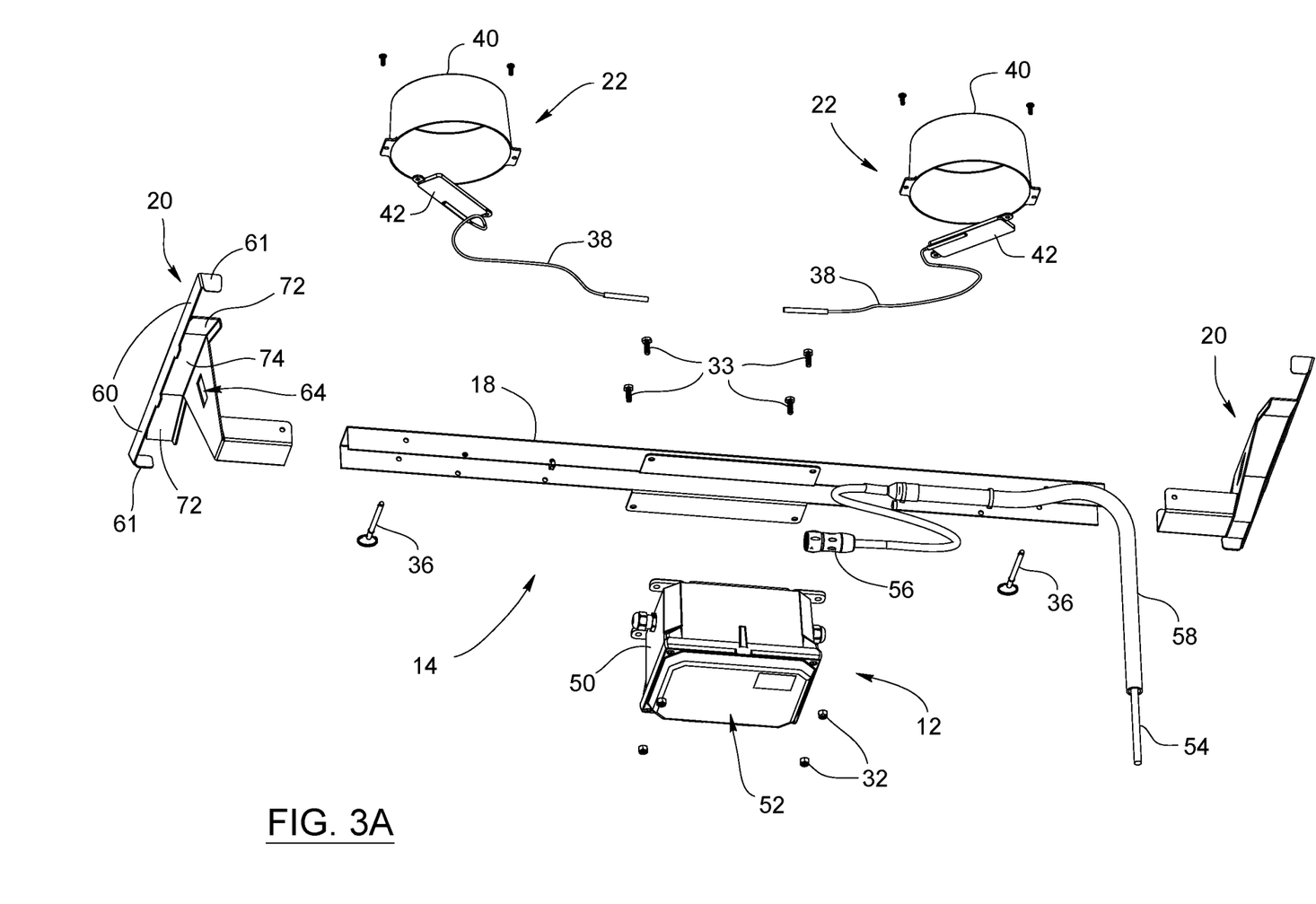
FIG. 3A is an exploded isometric view showing a cradle assembly for a system with a rectangular cover according to the invention.

Referring to FIG. 2B, in the case where the cover 10 is round, its lower surface may have an arrangement of radial reinforcement ribs 76 projecting from a circular rib 77 surrounding cross-like ribs 79 at the center of the cover 10. A typical but not limitative dimension of a round cover 10 according to the invention is 802 mm of diameter. Referring to FIG. 3A, according to an embodiment, the cradle 14 may be structured so that the radio transceiver 12 and the antenna arrangements 22 are attached to the beam 18. The brackets 20 of the cradle 14 may take the form of guiding-clamps extending crosswise with respect to a longitudinal axis of the beam 18. Each guiding-clamp may have a central platform 74 and opposite side ramps 72 downwardly projecting on both sides of the central platform 74 in order to form an uplifting surface for legs 62 (shown e.g. in FIG. 2A) of the cover 10 in an area above the beam 18 when the cover 10 is transversely slid as described hereinafter. The radio transceiver 12, the antenna arrangements 22 and the brackets 20 may be fastened to the beam 18 by means of bolts 32, screws 33, cotter pins 36, glues or other appropriate fastening elements. The use of bolts 32 and cotter pins 36 allows in particular easy replacement of a component if necessary. The antenna arrangements 22 may be connected to the radio transceiver 12 by coaxial cables 38.

Figure 3B:
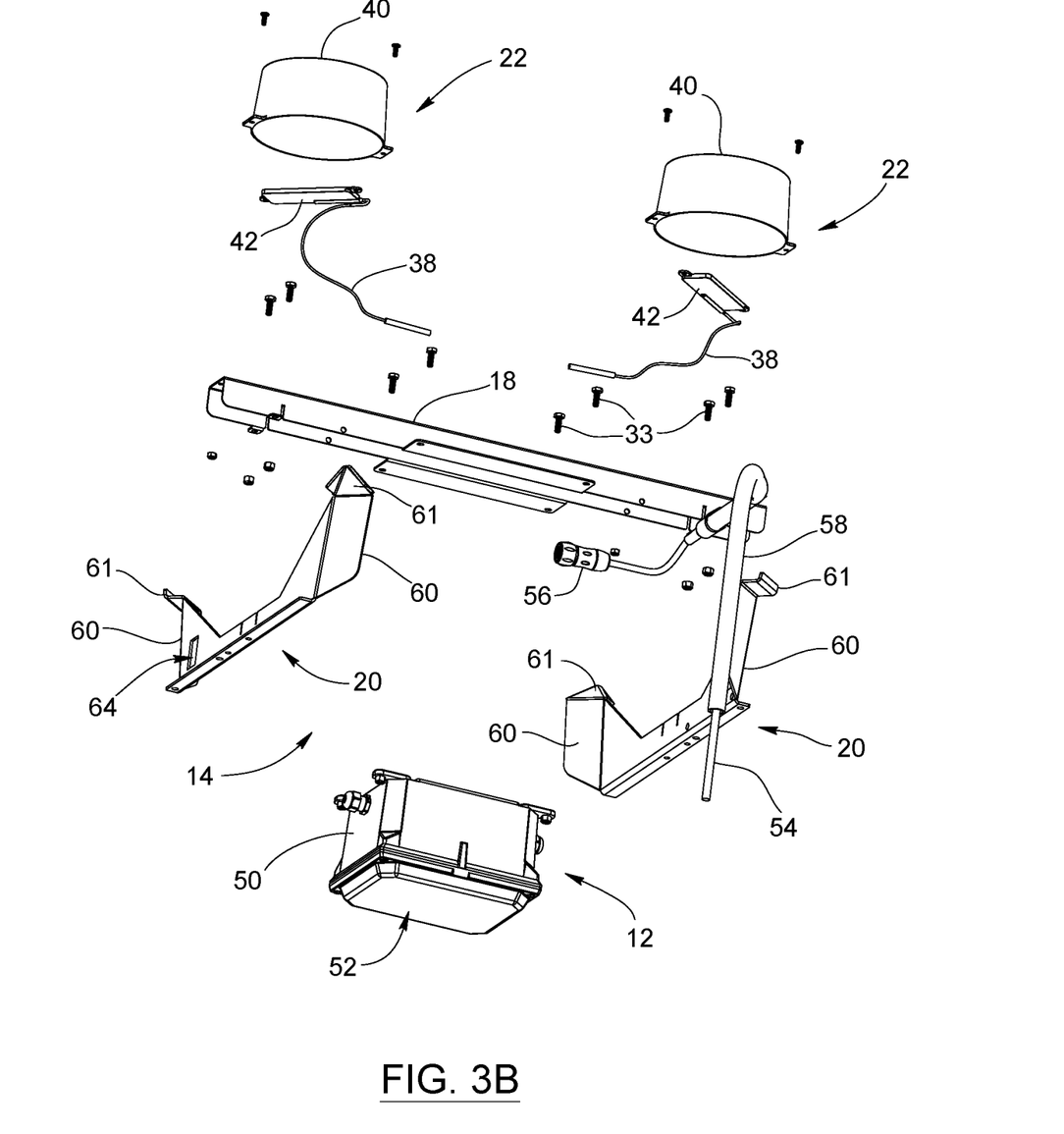
FIG. 3B is an exploded isometric view showing a cradle assembly for a system with a round cover according to the invention.

Referring to FIG. 3B, the brackets 20 of the cradle 14 may have a shape adapted for an underground structure 4 having a round opening as described hereinafter.

Figure 5:
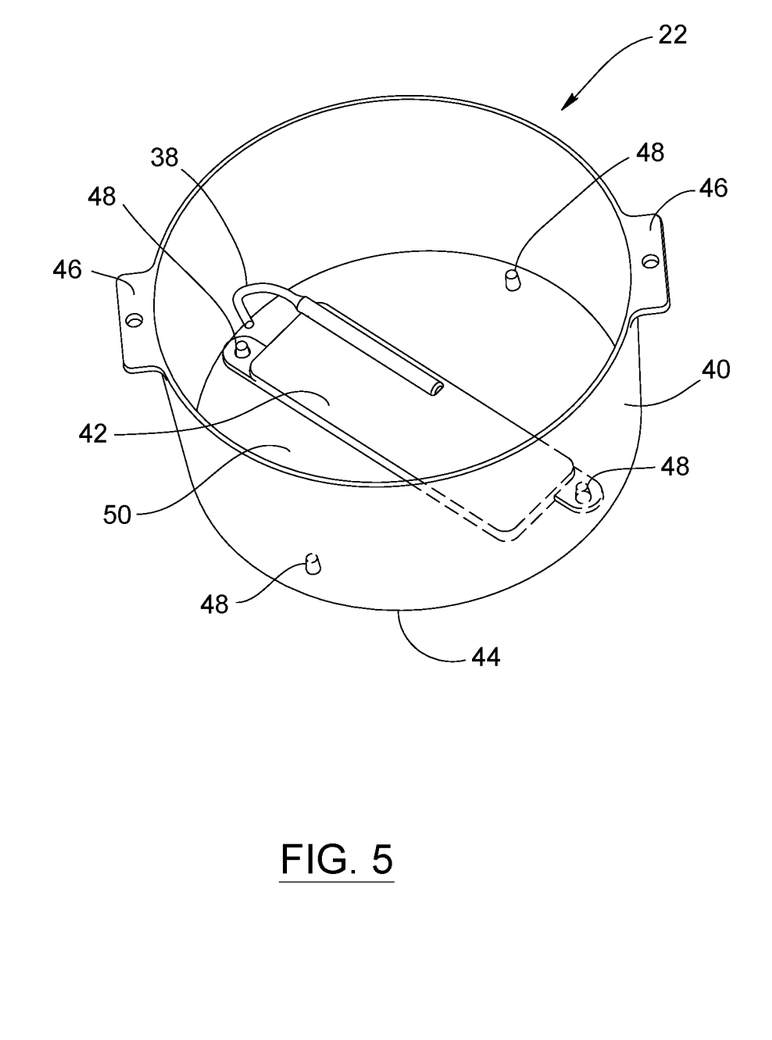
FIG. 5 is an isometric view showing an antenna arrangement according to the invention.
Figure 6A:
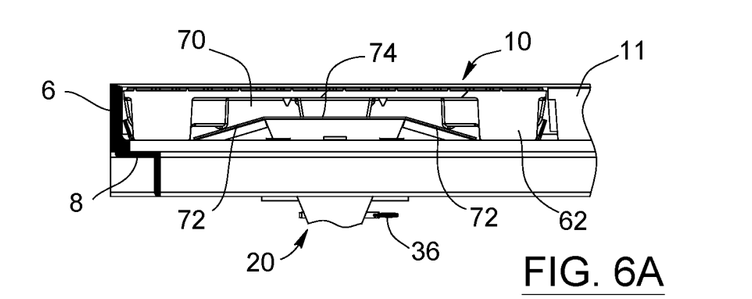
FIGS. 6A, 6B, 6C and 6D are partial cross-sectional views of a system according to the invention, illustrating different possible positions of a rectangular cover with respect to a cradle.
Figure 6B:
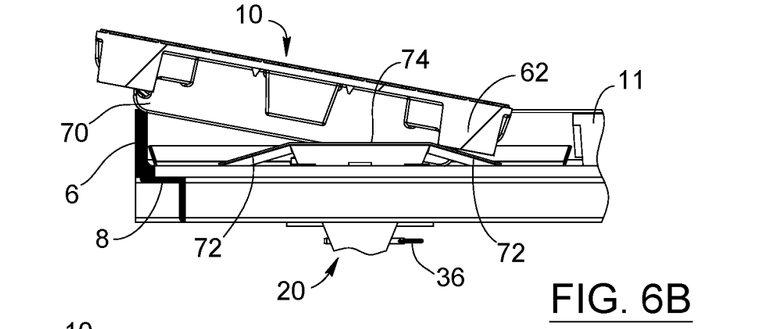
Figure 6C:
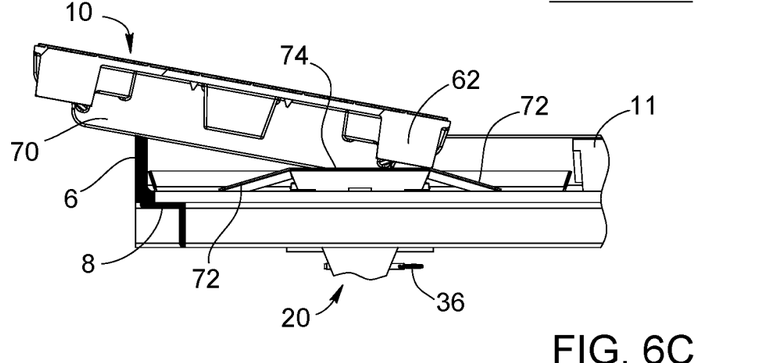
Figure 6D:
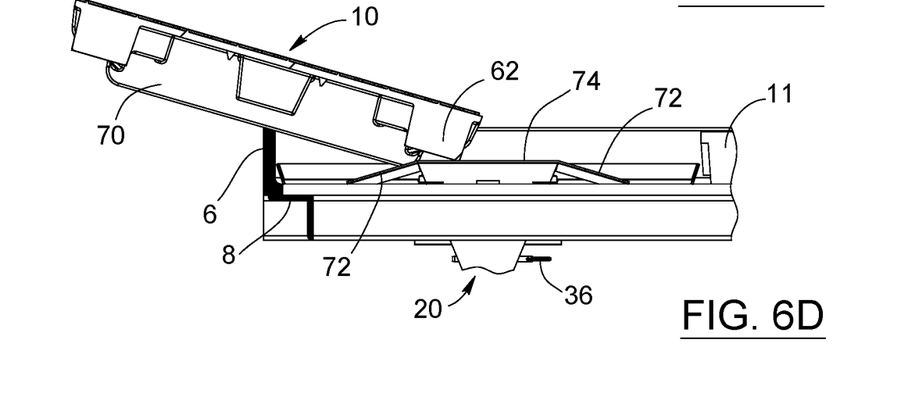

Referring to FIG. 5, according to an embodiment, each antenna arrangement 22 is made of a radome 40 and an antenna 42 or several antenna elements if desired. The radome 40 is preferably made of a plastic material, e.g. Nylon® 12. The radome 40 has a slightly conical dome shape and its upper surface 44 is preferably convex, in order to be complementary with the concave shape of the lower surface of a lens 17 (illustrated e.g. in FIGS. 2A and 2B). The antenna arrangement 22 may be fastened on the beam 18 (illustrated e.g. in FIGS. 3A and 3B) in at least one point. In the illustrated configuration, two wings 46 on the radome 40 allow fastening the antenna arrangement 22 to the beam 18. The antenna 42 (or several antenna elements) may be embodied by a printed circuit board ("PCB") that mounts inside the radome 40 and on which a copper trace may form a radiating element. Mounting points 48 projecting at the bottom 50 of the radome 40 allow precisely orienting the antenna 42 with respect to the mounting points defined by the wings 46 of the radome 40 on the beam 18 and thus with respect to the cover 10 (illustrated e.g. in FIGS. 2A and 2B).

According to an embodiment, the dielectric constant of the material used for the radomes (4.8 for Nylon® 12) is preferably of the same order as that of the material of the lenses 17 to promote a radio coupling between the antennas 42 and the lenses 17. Also, the antennas 42 are in contact with the bottom 50 or the inner surface of the radomes 40. The diameter of the radomes 40, e.g. 150 mm, is of a same order of size as the lower opening of the portholes 16 (illustrated e.g. in FIGS. 2A and 2B), e.g. 140 mm, and the radomes 40 are centered under the lenses 17 when the cradle 14 and the cover 10 are in position. Furthermore, once the cradle 14 is in position under the cover 10, the distance in all points between the lower concave surface of the lenses 17 and the upper convex surface of the radomes 40 is preferably uniform, e.g. 10 mm, thus defining a constant gap. The height of the radomes 40 allows maintaining a distance, e.g. 75 mm, between the antennas 42 and the other metal elements that could alter a radiating pattern of the antennas 42.

The set of a lens 17 and an antenna arrangement 22 allows a passage of radio waves over a wide frequency range, e.g. from 700 MHz to over 3 GHz. Preferably, wideband omni-directional antennas, e.g. from 700 MHz to 2.7 GHz, having linear polarizations are used. The antennas 42 may be directional or omnidirectional. The antennas 42 may have linear or circular polarizations.

In the configuration illustrated in FIG. 5, the antenna 42 is an omnidirectional antenna mounted at the horizontal inside the radome 40. The use of several antennas 42, the distance between them and their mutual orientations allow maximizing the space diversity effects, compensating for the zeros of their radiating patterns and their polarization (linear or circular), as well as taking advantage of the combination of the signals (MIMO effect). In the embodiment illustrated in FIGS. 3A and 3B, there are two radomes 40 each containing an omnidirectional antenna 42 mounted at the horizontal and at 90 degrees from each other. The angle of 90 degrees between the two antennas 42 advantageously allows compensating for the linear (or circular) polarization of the antennas 42. The distance between the antennas 42 allows taking advantage of the space diversity (compensating for the zeros). The connection of the antennas 42 to the same radio transceiver 12 allows maximizing the MIMO effect (2×2) with a remote radio station (not shown), as a cellular base station.

Referring back to FIG. 3A, the radio transceiver 12 may be installed in a casing 50 that is preferably watertight. The casing 50 may be fastened to the support section of the beam 18, and in particular under the beam 18, with its opening 52 directed down, thus upside-down, at a central position of the beam 18. The casing 50 may contain various devices (not shown), such as a power supply source as a battery, a power supply converter as a PoE ("Power over Ethernet") extractor and a controller, a measurement, acquisition or data processing apparatus, one or more sensors as a gas detector, a water level measuring sensor, a motion detector, and infrared camera, a wireless or wired device for local telecommunication with various apparatuses (not shown) present in the underground structure 4.

The radio transceiver 12 may be a cellular modem for cellular telecommunications with the equipment 2. The antennas 42 of the antenna arrangements 22 are positioned in order to be centered under the lenses 17 inserted in the portholes 16 of the cover 10 when the cover 10 is in position in the opening of the underground structure 4 (as shown in FIGS. 1A and 1B). The radomes 40 define protective chambers for the antennas 42 in case of flooding in the underground structure 4 or of surface water flowing down in the underground structure 4 as a result of their convex upper surface (while the lenses 17 have corresponding concave lower surfaces) forming arrangements promoting the draining of a liquid while minimizing and maintaining a uniform distance between the upper surfaces of the radomes 40 and the lower surfaces of the lenses 17. The concave lower surfaces of the lenses 17 advantageously promote the radio signals towards the horizon, from and towards the remote outer radio stations.

Referring also to FIGS. 1A and 1B, a cable 54 providing power supply and communication functions, preferably of Ethernet type, may be used at the same time for supplying power to the elements contained in the casing 50 and for communicating between the casing 50 and the equipment 2 located in the underground structure 4. The cable 54 is preferably flexible and provided with a watertight and submersible connector 56 at each end. The cable 54 may be inserted into a semi-rigid conduit 58 e.g. having a diameter of 19 mm and a length of 1.5 m, that allows protecting the cable 54 at the mounting points on the beam 18, directing the cable 54 towards a wall of the shaft 60 of the underground structure 4 and satisfying a minimum curvature radius of the cable 54, e.g. of 10 cm.

The equipment 2 may be, for example, an acquisition system, a programmable logic controller, a data computation and processing unit, a power supply, etc.

The alignment in all three axes between the cover 10 and the cradle 14 allows at the same time centering the antenna arrangements 22 under the lenses 17 and obtaining a uniform distance between the concave bottom of the lenses 17 and the convex top of the radomes 40 of the antenna arrangements 22. The height of the guiding-clamps 20 and their bearings on the frame 6 as for the cover 10 allow vertically aligning the cradle 14 with respect to the cover 10.

Referring again to FIG. 3A, for a rectangular cover 10 (as illustrated e.g. in FIG. 2A), according to an embodiment, the guiding-clamps 20 are provided with two opposite arms 60 extending crosswise with respect to the longitudinal axis of the beam 18. The arms 60 may be formed of a single piece as illustrated if desired. The arms 60 have ends 61 forming stops cooperating with contact surfaces of the cover 10 in order to define an alignment position of the cradle 14 under the cover 10 when the cradle 14 and the cover 10 are in position in the opening. The contact surfaces may be formed by outer faces of the legs 62 (as shown e.g. in FIG. 2A) downwardly projecting at the four corners of the cover 10 and resting against the shoulder 8 (illustrated in FIG. 1A) when the cover 10 is in position in the opening. The ends 61 of the arms 60 may have bent portions spaced from each other by a distance corresponding to that of the outer faces of the legs 62 so that the arms 60 embrace and come into contact preferably at an angle with the legs 62 of the cover 10. The contact points between the arms 60 of the guiding-clamps 20 and the legs 62 of the rectangular cover 10 allow obtaining an alignment of the cradle 14 with respect to the cover 10 in both longitudinal and transverse axes.

Figure 4:
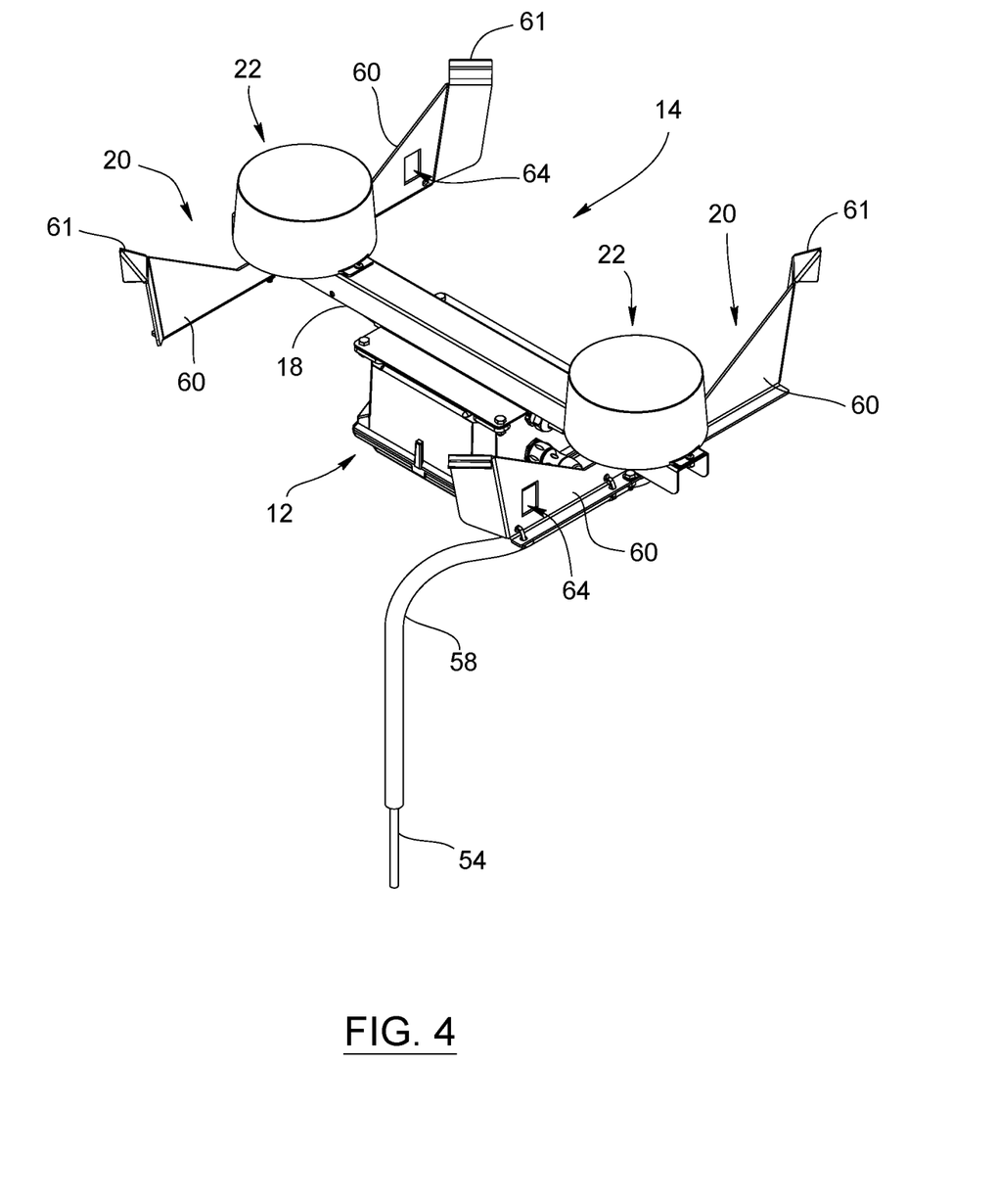
FIG. 4 is an isometric view of a cradle for a system with a round cover according to the invention.

Referring to FIGS. 2B, 3B and 4, for a round cover 10, according to an embodiment, the arms 60 of the guiding-clamps 20 have bent ends 61 projecting in radial directions of the cover 10 and forming bearing surfaces on the shoulder 8 (shown in FIG. 1B) in radial axes. The ends 61 of the arms 60 may have other shapes than those illustrated if desired. At least one of the bearing point acts as a stop. The stop may have an angled shape (as illustrated) or a round off shape (concave or convex). The cooperating shape of chosen surfaces of the cover 10, such as peripheral notches 78, defines a position of alignment in rotation and in translation between the cradle 14 and the cover 10.

Referring back to FIGS. 1A and 1B, the installation of the telecommunication system according to the invention may begin by a setting of the cradle 14 in position in the opening followed by a setting of the cover 10 in position. The removal is carried out in a reverse sequence. The placing or removal of the cradle 14 may be performed by vertically setting it down by aligning the brackets 20, e.g. the arms 60 of the guiding-clamps (illustrated e.g. in FIGS. 3A and 3B), on the shoulder 8 of the frame 6 of the underground structure 4. Openings 64 (as illustrated in FIGS. 3A and 3B) for gripping tools (not shown) in the brackets 20 may be used for manipulating the cradle 14 during its insertion into or extraction from the opening. Prior to or after the insertion of the cradle 14 in the opening, the cable 54 is connected to the casing 50 of the radio transceiver 12 and to the equipment 2 if it is not already connected to it. The cover 10 is placed or removed from the opening of the structure 4 either vertically or laterally slid as shown in FIGS. 6A, 6B, 6C and 6D for a rectangular cover 10 and in FIGS. 7A, 7B and 7C for a round cover 10, using openings 66 (illustrated e.g. in FIGS. 2A and 2B) provided for gripping tools (not shown). A wireless telecommunication may then be established by the radio transceiver 12 with the equipment 2 via the antenna arrangements 22 connected to the radio transceiver 12 and the lenses 17.

Referring to FIGS. 6A, 6B, 6C and 6D, according to an embodiment, the handling of a rectangular cover 10 for an installation or removal by transverse sliding may be identical to the existing rectangular covers because the system according to the invention may be installed in replacement to an existing cover without needing to change the underground structure 4. Near the antenna arrangements 22 (illustrated e.g. in FIG. 1A), the ribs 68 (illustrated e.g. in FIG. 2A) projecting from the lower surface of the cover 10, and the bottom of the shoulders 24 of the portholes 16 and the bottom of the lenses 17 (illustrated e.g. in FIG. 2A) are arranged and formed so as to not come into contact with the antenna arrangements 22. The shapes of the runners 70 and the guiding-clamps 20 contribute to keep a spacing between the cover 10 and the antenna arrangements 22 during a transverse movement of the cover 10. In the illustrated sequence, the cover 10 is lifted on one side and then slid with a gripping tool (not shown). Throughout the movement, the runners 70 are in contact with the frame 6 or an adjacent panel or cover 11 if any. On an opposite side of the cover 10, the legs 62 first slide on the shoulder 8 of the frame 6, then on ramps 72 of the guiding-clamps 20 and then on platforms 74 of the guiding-clamps 20. The cover 10 rises when the legs 62 get into contact with the ramps 72 of the guiding-clamps 20. When the center of mass of the cover 10 gets beyond half of the width of the opening, the cover 10 topples at the horizontal. The sliding movement may then continue at the horizontal until the opening is completely cleared. A reverse sequence is performed to install the cover 10. A height of the ramps 72 is proportional to a height of the longitudinal and transverse ribs 68, 69 (illustrated e.g. in FIG. 2A) of the cover 10 that must remain clear. Lengths of the platforms 74 and the ramps 72 may be adjusted to minimize the slope and facilitate the movement.

Figure 7A:
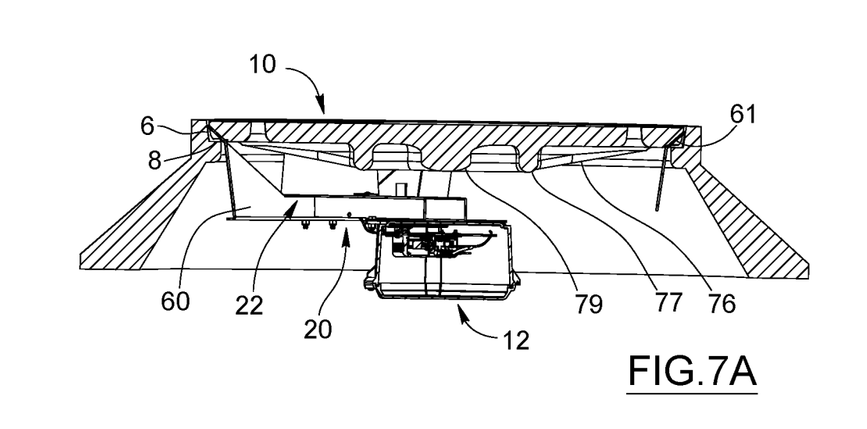
FIGS. 7A, 7B and 7C are partial cross-sectional views of a system according to the invention, illustrating different possible positions of a round cover with respect to a cradle.
Figure 7B:
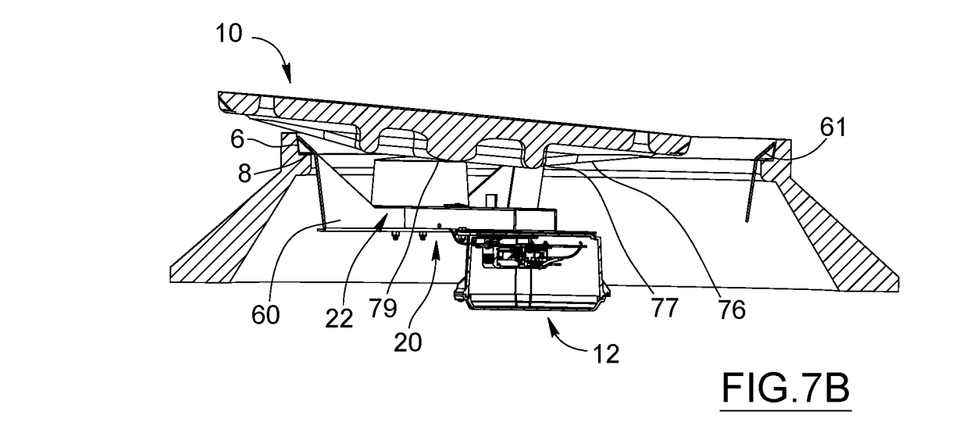
Figure 7C:
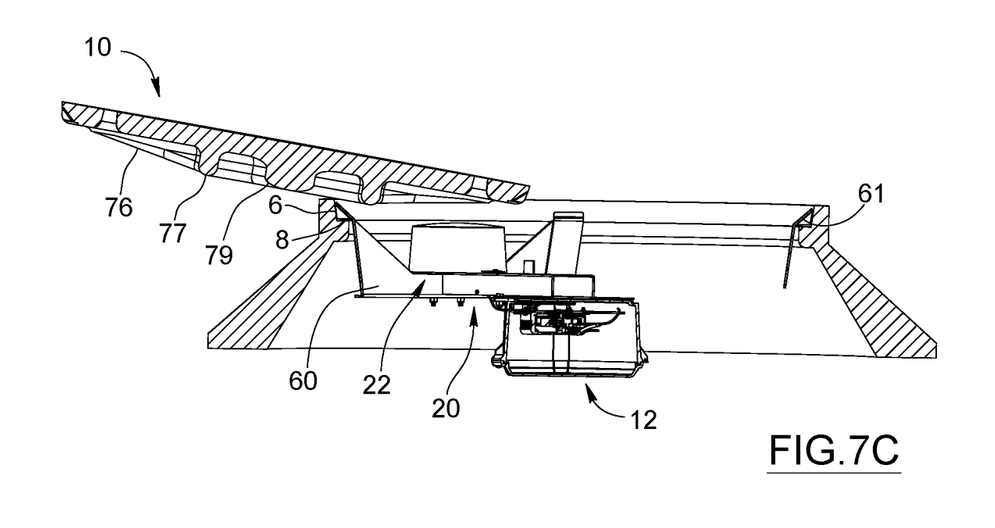

Referring to FIGS. 7A, 7B and 7C, a handling of a round cover 10 for an installation or removal by transverse sliding may be similar to that for a rectangular cover. The installation or removal is performed using a gripping tool (not shown) inserted in one of the openings 66 of the cover 10 (illustrated e.g. in FIG. 2B). A displacement of the cover 10 is carried out in a direction of an alignment axis of the openings 66. The alignment axis of the openings 66 preferably lines up with axes of the radial ribs 76 projecting under the cover 10 or axes at the center of the radial ribs 76 as in the illustrated case. The peripheral notches 78 (illustrated e.g. in FIG. 2B) cooperating with the ends 61 of the brackets 20 (illustrated e.g. in FIG. 4) are positioned on the rim of the cover 10, with two of the notches 78 in a same axis as the openings 66. The notches 78 limit a movement of the cover 10 in the alignment axis of the openings 66. The movement of the cover 10 in this axis remains locked as long as the radial rib(s) 76 adjacent to the gripping point under the cover 10 are not clear. During the axial movement, the cover 10 is in contact with the edge of the frame 6 in three or four points (one or two ribs 76 or the rim of the cover 10). The cover 10 topples at the horizontal when its center of gravity gets beyond the opening. The profile of the ribs 76 and the rim of the cover 10 determine a height of a clearance between the cover 10 and the antenna arrangements 22.

While embodiments of the invention have been illustrated in the accompanying drawings and described above, it will be evident to those skilled in the art that modifications may be made therein without departing from the invention.

The invention claimed is:

1. Wireless telecommunication system for an equipment in an underground structure having an upper frame defining an opening with a cover-supporting shoulder, the system comprising:
   a metal cover having a shape fitting in the opening so that the cover is supportable in position in the opening by the shoulder;
   at least one porthole formed in the cover, the porthole having a lens in plastic material letting radio waves pass;
   a cradle having a beam and brackets projecting at opposite ends of the beam, the brackets defining bearing surfaces against the shoulder in order to hang the beam across the opening when the cradle is in position in the opening, the beam having a support section extending lower than the bearing surfaces;
   at least one antenna arrangement mounted on the support section; and
   a radio transceiver connecting to the antenna arrangement and to the equipment in the underground structure to establish a wireless telecommunication with the equipment via the antenna arrangement and the lens, wherein the antenna arrangement comprises a radome having a bottom, and an antenna extending at the bottom of the radome, the radome having a convex upper surface, and the lens having a concave lower surface complementary to the convex upper surface of the radome, the convex upper surface and the concave lower surface defining a substantially constant gap when the cradle and the cover are in position in the opening of the underground structure.

2. Wireless telecommunication system according to claim 1, wherein the cover has a lower surface comprising an arrangement of reinforcement ribs.

3. Wireless telecommunication system according to claim 2, wherein:
   the shape of the cover is rectangular; and
   two of the reinforcement ribs extend crosswise on opposite sides of the cover and form runners for sliding of the cover on the upper frame of the underground structure when the cover is transversely slid.

4. Wireless telecommunication system according to claim 1, wherein:
   the shape of the cover is rectangular with corners comprising legs projecting under the cover so that the legs rest on the shoulder when the cover is in position in the opening; and
   the brackets comprise guiding-clamps extending crosswise with respect to a longitudinal axis of the beam, each guiding-clamp having a central platform and opposite lateral ramps downwardly projecting on both sides of the central platform in order to form an uplifting surface for the legs of the cover in an area above the beam when the cover is transversely slid.

5. Wireless telecommunication system according to claim 4, wherein the guiding-clamps comprise respective pairs of opposite arms extending crosswise with respect to the longitudinal axis of the beam, the arms having ends forming stops cooperating with predetermined contact surfaces of the cover in order to define an alignment position of the cradle under the cover when the cradle and the cover are in position in the opening.

6. Wireless telecommunication system according to claim 5, wherein the predetermined contact surfaces are formed by outer faces of the legs of the cover.

7. Wireless telecommunication system according to claim 1, wherein:
the shape of the cover is round, the cover having peripheral notches cooperating with peripheral stops protruding in the frame in order to define an alignment position of the cover in the opening; and
the brackets comprise respective pairs of opposite arms extending crosswise with respect to the longitudinal axis of the beam, the arms having bent ends projecting in radial directions of the cover and forming the bearing surfaces.

8. Wireless telecommunication system according to claim 1, wherein the cover has openings formed in opposite longitudinal portions of the cover and into which gripping tools are engageable for lifting and sliding the cover over the opening of the underground structure.

9. Wireless telecommunication system according to claim 1, wherein the porthole defines a circular opening into which the lens is inserted, said opening having a lower peripheral shoulder forming a resting surface for the lens, the lower peripheral shoulder and the lens respectively having alignable holes and inserts for receiving bolts for mounting the lens in the porthole from a lower side of the cover.

10. Wireless telecommunication system according to claim 1, wherein said at least one porthole comprises several portholes spaced apart in the cover, and said at least one antenna arrangement comprises as many antenna arrangements as portholes, the antenna arrangements having respective antennas oriented in order to exhibit complementary polarizations.

11. Wireless telecommunication system according to claim 1, wherein the radio transceiver comprises a cellular modem having a watertight casing fastened to the beam of the cradle.

12. Wireless telecommunication system according to claim 11, wherein the casing of the cellular modem is mounted upside down under the support section at a central position of the beam.

13. Wireless telecommunication system according to claim 1, wherein the radio transceiver has a cable providing functions of communication with the equipment and of power supply for the radio transceiver.

14. Wireless telecommunication system according to claim 1, wherein the lens has a relative permittivity greater than air.

15. Wireless telecommunication system according to claim 1, wherein the plastic material of the lens is a G10 composite material.

16. Wireless telecommunication system according to claim 1, wherein the lens and the cover have upper surfaces extending in a same plane.

17. Wireless telecommunication system according to claim 1, wherein the antenna arrangement comprises a directional or omnidirectional antenna having a linear or circular polarization.

18. Wireless telecommunication system according to claim 1, wherein the cradle has stops cooperating with predetermined contact surfaces of the cover in order to define an alignment position of the lens with the antenna arrangement under the cover when the cradle and the cover are in position in the opening.

19. Method for providing a wireless link to an equipment in an underground structure having an upper frame defining an opening with a cover-supporting shoulder cover, the method comprising the steps of:
positioning a cradle in the opening, the cradle having a beam and brackets projecting at opposite ends of the beam, the brackets defining bearing surfaces against the shoulder in order to hang the beam across the opening, the beam having a support section extending lower than the bearing surfaces, at least one antenna arrangement being mounted on the support section of the beam;
connecting a radio transceiver to the antenna arrangement and to the equipment in the underground structure;
positioning a metal cover having a shape fitting in the opening so that the cover is supported in the opening by the shoulder, at least one porthole being formed in the cover, the porthole having a lens in plastic material letting radio waves pass, the antenna arrangement extending near and in alignment with the lens when the cradle and the cover are in position in the opening; and
establishing a wireless telecommunication by the radio transceiver with the equipment via the antenna arrangement and the lens, wherein the antenna arrangement comprises a radome having a bottom, and an antenna extending at the bottom of the radome, the radome having a convex upper surface, and the lens having a concave lower surface complementary to the convex upper surface of the radome, the convex upper surface and the concave lower surface defining a substantially constant gap when the cradle and the cover are in position in the opening of the underground structure.

20. Wireless telecommunication system according to claim 19, further comprising:
providing the cradle with stops cooperating with predetermined contact surfaces of the cover in order to define an alignment position of the lens with the antenna arrangement under the cover when the cradle and the cover are in position in the opening.

* * * * *